(12) United States Patent
Matsumoto

(10) Patent No.: US 7,846,218 B2
(45) Date of Patent: Dec. 7, 2010

(54) METHOD OF MANUFACTURING ELECTROLYTIC CAPACITOR

(75) Inventor: Takayuki Matsumoto, Takeo (JP)

(73) Assignees: SANYO Electric Co., Ltd., Moriguchi-shi (JP); SAGA SANYO INDUSTRIES Co., Ltd., Kishima-gun (JP)

( * ) Notice: Subject to any disclaimer, the term of this patent is extended or adjusted under 35 U.S.C. 154(b) by 0 days.

(21) Appl. No.: 12/650,761

(22) Filed: Dec. 31, 2009

(65) Prior Publication Data

US 2010/0170070 A1 Jul. 8, 2010

(30) Foreign Application Priority Data

Jan. 7, 2009 (JP) ............................. 2009-001610

(51) Int. Cl.
*H01G 9/00* (2006.01)
(52) U.S. Cl. ................................................. 29/25.03
(58) Field of Classification Search ................ 29/25.03
See application file for complete search history.

(56) References Cited

U.S. PATENT DOCUMENTS 5,153,820 A * 10/1992 MacFarlane et al. ........ 361/525

FOREIGN PATENT DOCUMENTS

JP 2000-277388 A 10/2000

* cited by examiner

*Primary Examiner*—Alexander G Ghyka
*Assistant Examiner*—Seahvosh J Nikmanesh
(74) *Attorney, Agent, or Firm*—Westerman, Hattori, Daniels & Adrian, LLP

(57) ABSTRACT

As to each of a capacitor element employing an anode foil having a matrix made of a metal and a film, provided on the surface of the matrix, made of an oxide of a metal different from the metal of the matrix and a capacitor element employing an anode foil having a matrix made of a prescribed metal and a film of an oxide of the metal and a cathode foil having a matrix made of another metal different from the metal, formation treatment is performed on an end face of the anode foil exposing the surface of the metal forming the matrix by applying a positive voltage to an anode lead wire and applying a negative voltage to a cathode lead wire. Thus, an electrolytic capacitor resistant against corrosion or the like is obtained.

4 Claims, 4 Drawing Sheets

| ANODE FOIL | CATHODE FOIL | NUMBER OF CORRODED ELEMENTS/ SUM OF SAMPLES | |
|---|---|---|---|
| FILM / MATRIX | FILM / MATRIX | (INVENTIVE EXAMPLE) | (COMPARATIVE EXAMPLE) |
| $Nb_2O_5$ / Al | TiN / Al | 0/30 | NO VOLTAGE INCREASING |
| $Nb_2O_5$ / Al | UNFILMED / Al | 0/30 | 26/30 |
| $Ta_2O_5$ / Al | TiN / Al | 0/30 | NO VOLTAGE INCREASING |
| $Ta_2O_5$ / Al | UNFILMED / Al | 0/30 | 14/30 |

METHOD OF MANUFACTURING ELECTROLYTIC CAPACITOR

BACKGROUND OF THE INVENTION

1. Field of the Invention

The present invention relates to a method of manufacturing an electrolytic capacitor, and more particularly, it relates to a method of manufacturing an electrolytic capacitor by winding an anode foil and a cathode foil.

2. Description of the Background Art

At present, an electrolytic capacitor employing a conductive polymer such as polypyrrole, polythiophene, polyfuran or polyaniline or TCNQ complex (7,7,8,8-tetracyanoquinodimethane) as an electrolyte is watched with interest. A method of manufacturing such an electrolytic capacitor is now described. First, formation is performed on an aluminum foil, for forming an aluminum oxide film on the surface thereof. Then, the aluminum foil provided with the aluminum oxide film is cut into a prescribed size to form a zonal anode foil. Another aluminum foil is cut into a prescribed size to form a zonal cathode foil.

Then, an anode foil 103 and a cathode foil 104 cut into zonal shapes respectively are wound with separator sheets 105 and 106 interposed therebetween for forming a capacitor element 102, as shown in FIG. 5. An anode lead wire 109 electrically connected to anode foil 103 through a lead tab terminal 108 and a cathode lead wire 110 electrically connected to cathode foil 104 through a lead tab terminal 108 project from capacitor element 102 respectively.

Then, reformation (end face treatment) is performed on the cut surface (end face) of anode foil 103 exposing aluminum and a damaged portion of the aluminum oxide film. Then, capacitor element 102 is dipped in a prescribed chemical solution stored in a formation vessel 121, as shown in FIG. 6. Then, positive and negative potentials are applied to anode lead wire 109 and formation vessel 121 respectively, thereby forming films of aluminum oxide on the cut surface of anode foil 103 and the damaged portion of the aluminum oxide film.

Then, heat treatment is performed on capacitor element 102 at a temperature of about 150° C. to 300° C., to impregnate capacitor element 102 with a solid electrolyte. Then, capacitor element 102 impregnated with the solid electrolyte is sealed with a rubber packing 112 and stored in an aluminum case 111, as shown in FIG. 7. Then, an opening of aluminum case 111 is transversely drawn and curled. Thereafter aging is performed to complete an electrolytic capacitor 101. Japanese Patent Laying-Open No. 2000-277388 discloses a method of manufacturing this type of electrolytic capacitor, for example.

As hereinabove described, the aluminum oxide film is formed on the surface of the aluminum foil by formation in the anode foil of the conventional electrolytic capacitor. In recent years, increase in capacitance has been required to an electrolytic capacitor.

The inventor has attempted to apply a material having a higher dielectric constant to a film of an anode foil in order to increase the capacitance of a capacitor element without increasing the size thereof, and prototyped an electrolytic capacitor with an anode foil prepared from an aluminum foil provided with a dielectric film of niobium oxide, tantalum oxide or titanium oxide in place of aluminum oxide.

Thus, the inventor has proven for the first time that a capacitor element having such an anode foil is corroded or a deposit is formed on the surface of the capacitor element if the capacitor element is dipped in a formation vessel and subjected to reformation (see FIG. 6). In particular, it has been recognized that a portion of the capacitor element opposite to the side connected with a lead terminal is remarkably corroded.

SUMMARY OF THE INVENTION

The present invention has been proposed in order to solve the aforementioned problem that has been ascertained for the first time, and an object thereof is to provide a method of manufacturing an electrolytic capacitor to corrosion or the like.

A method of manufacturing an electrolytic capacitor according to a first aspect of the present invention the present invention includes the following steps: A capacitor element is formed by winding an anode foil having a matrix made of a prescribed metal and a film made of a metal oxide of a metal different from the metal of the matrix and a cathode foil. A metal oxide film of the metal is formed on an end face of the anode foil exposing the surface of the metal by applying a positive voltage to an anode lead wire electrically connected to the anode foil and applying a negative voltage to a cathode lead wire electrically connected to the cathode foil while dipping the capacitor element in a prescribed chemical solution stored in a formation vessel.

A method of manufacturing an electrolytic capacitor according to a second aspect of the present invention the present invention includes the following steps: A capacitor element is formed by winding an anode foil having a matrix made of a first metal and a film made of a metal oxide of the first metal and a cathode foil having a matrix made of a second metal different from the first metal. A first metal oxide film of the first metal is formed on an end face of the anode foil exposing the surface of the first metal by applying a positive voltage to an anode lead wire electrically connected to the anode foil and applying a negative voltage to a cathode lead wire electrically connected to the cathode foil while dipping the capacitor element in a prescribed chemical solution stored in a formation vessel.

In the method of manufacturing an electrolytic capacitor according to the first aspect of the present invention, the capacitor element can be prevented from corrosion or the like in the step of forming the metal oxide film on the end face (or a cut surface) of the anode foil.

In the method of manufacturing an electrolytic capacitor according to the second aspect of the present invention, the capacitor element can be prevented from corrosion or the like in the step of forming the first metal oxide film on the end face (or a cut surface) of the anode foil.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A method of manufacturing an electrolytic capacitor according to an embodiment of the present invention is now described. First, a material prepared by evaporating a niobium oxide film ($Nb_2O_5$) as an oxide film to the surface of an aluminum foil serving as a matrix or a material prepared by evaporating a tantalum oxide film ($Ta_2O_5$) to the surface of an aluminum foil is employed as the material for an anode foil. Further, a material prepared by evaporating a titanium nitride film to the surface of an aluminum foil serving as a matrix or a material of an aluminum foil provided with no film on the surface thereof is employed as the material for a cathode foil.

Figure 1:
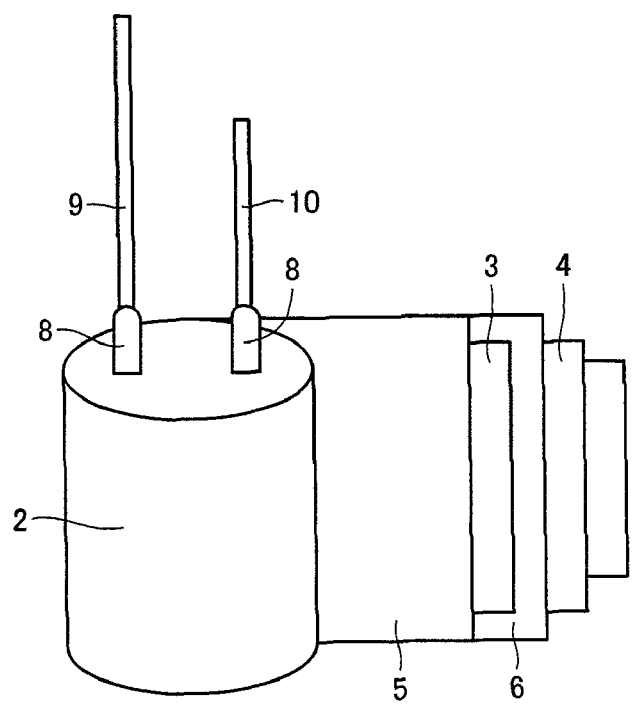
FIG. 1 is a perspective view showing a step included in a method of manufacturing an electrolytic capacitor according to an embodiment of the present invention.

Then, a zonal anode foil is formed by cutting the material therefor into a prescribed size. Further, a zonal cathode foil is formed by cutting the material therefor into a prescribed size. Then, a capacitor element 2 is formed by winding an anode foil 3 and a cathode foil 4 cut into zonal shapes respectively with interposition of separator sheets 5 and 6, as shown in FIG. 1.

Figure 2:
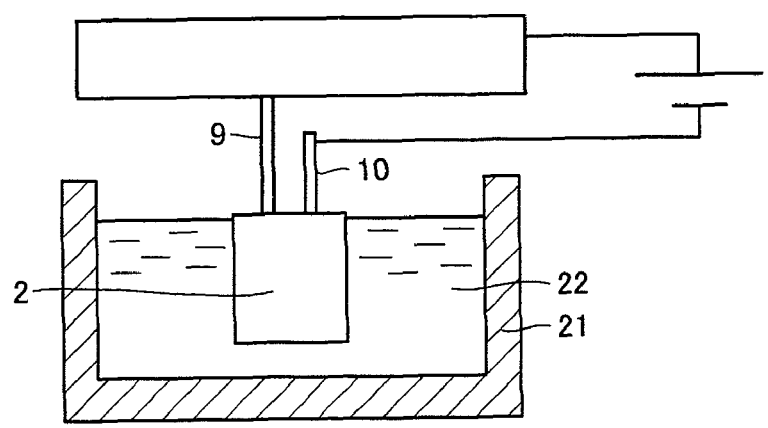
FIG. 2 is a side elevational view showing a step carried out subsequently to the step shown in FIG. 1 in the method of manufacturing an electrolytic capacitor according to the embodiment.

Then, end face treatment (formation) is performed for forming oxide films on a cut surface (end face) of anode foil 3 or the like and a damaged portion of the oxide film in capacitor element 2. Then, capacitor element 2 is dipped in a prescribed chemical solution 22 stored in a formation vessel 21, as shown in FIG. 2. Then, films of aluminum oxide are formed on the surfaces of aluminum exposed on the cut surface of anode foil 3 or the like and the damaged portion of the oxide film by applying positive and negative potentials to anode and cathode lead wires 9 and 10 respectively.

Figures 3, 4:
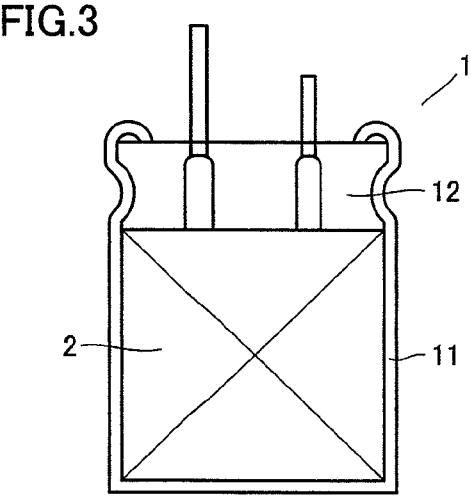
FIG. 3 is a side elevational view showing a step carried out subsequently to the step shown in FIG. 2 in the method of manufacturing an electrolytic capacitor according to the embodiment.
FIG. 4 is a diagram showing results of evaluation of states of capacitor elements subjected to end face treatment in methods of manufacturing electrolytic capacitors according to Examples of the present invention and comparative examples.
Figure 5:
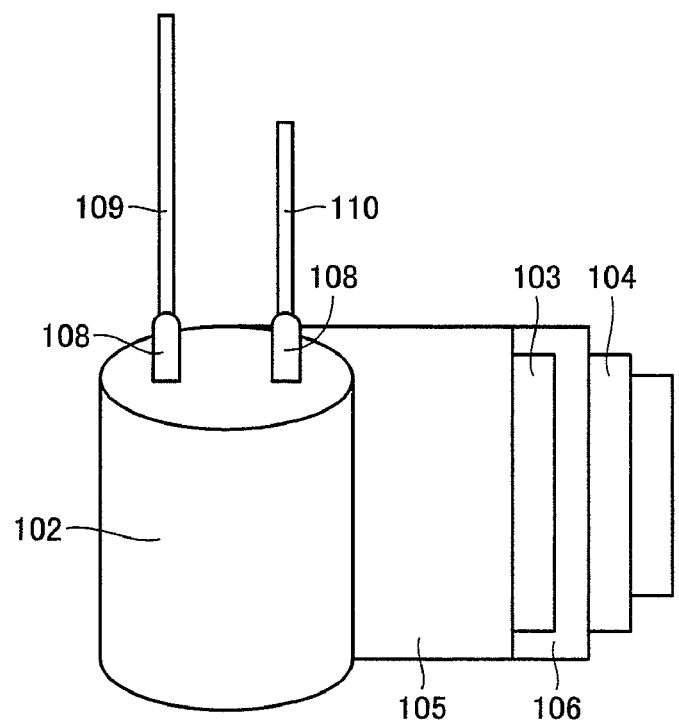
FIG. 5 is a perspective view showing a step included in a conventional method of manufacturing an electrolytic capacitor.
Figure 6:
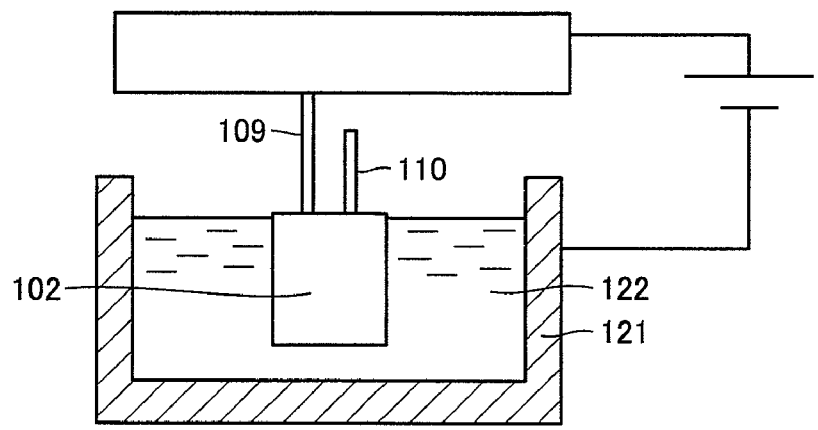
FIG. 6 is a side elevational view showing a step subsequent to the step shown in FIG. 5.
Figure 7:
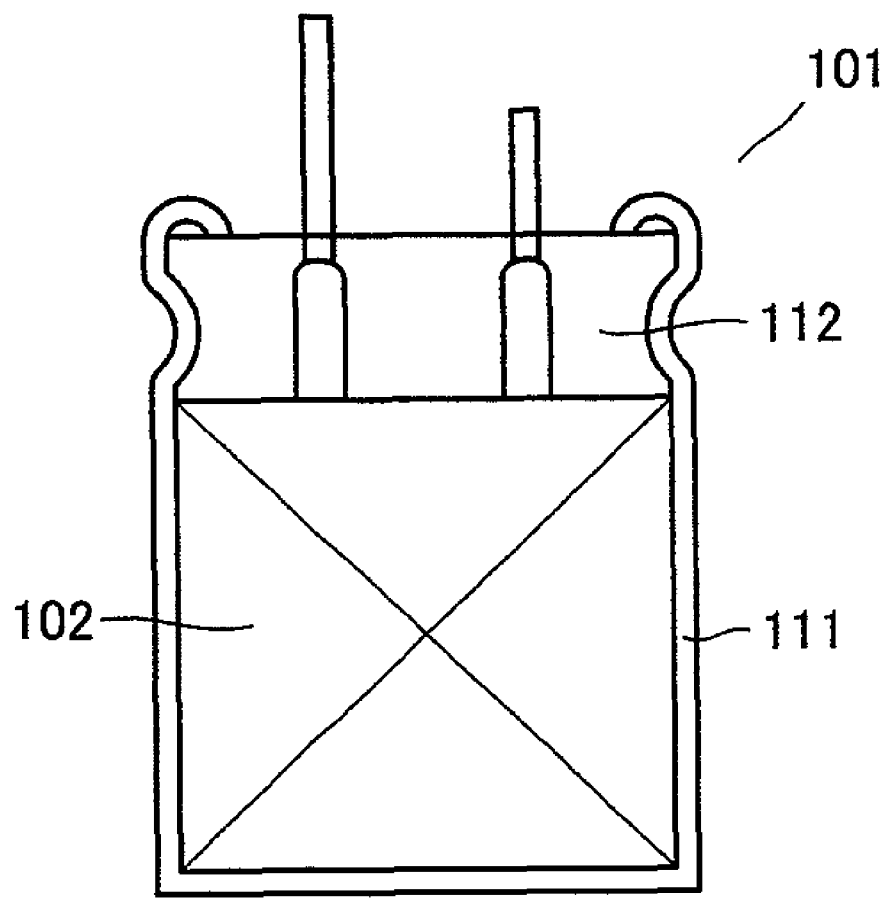
FIG. 7 is a side elevational view showing a step subsequent to the step shown in FIG. 6.

Then, heat treatment is performed on capacitor element 2 at a temperature of about 150° C. to 300° C., to impregnate capacitor element 2 with a solid electrolyte. Then, capacitor element 2 impregnated with the solid electrolyte is sealed with a rubber packing 12 and stored in an aluminum case 11, as shown in FIG. 3. Then, an opening of aluminum case 11 is transversely drawn and curled. Thereafter aging is performed to complete an electrolytic capacitor 1.

In relation to the aforementioned method, it has been proven that corrosion having been caused on a capacitor element and deposition upon application of a negative voltage to a formation vessel can be remarkably suppressed by applying a negative voltage to a cathode lead wire of a capacitor element. Results of evaluation are now described.

FIG. 4 is a diagram showing results of evaluation of states of capacitor elements, manufactured by the aforementioned method and a conventional method respectively, subjected to end face treatment. 30 samples were evaluated as to each type of capacitor element.

As shown in FIG. 4, no voltage increasing was caused when a negative voltage was applied to a formation vessel (comparative example) while no capacitor element was corroded when a negative voltage was applied to a cathode lead wire (inventive example) in samples 1 (anode foil: $Nb_2O_5/Al$, cathode foil: TiN/Al). In samples 2 (anode foil: $Nb_2O_5/Al$, cathode foil: unfilmed/Al), 26 out of 30 samples were corroded when a negative voltage was applied to a formation vessel (comparative example), while no capacitor element was corroded when a negative voltage was applied to a cathode lead wire (inventive sample).

In samples 3 (anode foil: $Ta_2O_5/Al$, cathode foil: TiN/Al), no voltage increasing was caused when a negative voltage was applied to a formation vessel (comparative example), while no capacitor element was corroded when a negative voltage was applied to a cathode lead wire (inventive example). In samples 4 (anode foil: $Ta_2O_5/Al$, cathode foil: unfilmed/Al), 14 out of 30 samples were corroded when a negative voltage was applied to a formation vessel (comparative example), while no capacitor element was corroded when a negative voltage was applied to a cathode lead wire (inventive samples). "$Nb_2O_5/Al$" etc. in the above parentheses denote the materials for "film/matrix" respectively.

With the anode foils according to samples 1 to 4, it has been verified that a capacitor element employing an anode film having a matrix of a metal provided on the surface thereof with a film of an oxide of a metal different from the metal forming the matrix is corroded when a negative voltage is applied to a formation vessel to perform end face treatment while the capacitor element is not corroded when a negative voltage is applied to a cathode lead wire to perform end face treatment. It has also been proven that no oxide film (aluminum oxide) to be formed on an end face of the anode foil is correctly formed if the capacitor element is corroded, a deposit is formed thereon or no voltage increasing is caused.

The inventor has similarly evaluated samples 5 (anode foil: $TiO_2/Al$, cathode foil: TiN/Al) and samples 6 (anode foil: $TiO_2/Al$, cathode foil: unfilmed/Al), to confirm that no capacitor element is corroded when a negative voltage is applied to a cathode lead wire to perform end face treatment.

In addition to the samples 1 to 6, the inventor has also evaluated states of capacitor elements according to samples 7 (anode foil: $Nb_2O_5/Nb$, cathode foil: TiN/Al), samples 8 (anode foil: $Nb_2O_5/Nb$, cathode foil: unfilmed/Al), samples 9 (anode foil: $Ta_2O_5/Ta$, cathode foil: TiN/Al), samples 10 (anode foil: $Ta_2O_5/Ta$, cathode foil: unfilmed/Al), samples 11 (anode foil: $TiO_2/Ti$, cathode foil: TiN/Al), samples 12 (anode foil: $TiO_2/Ti$, cathode foil: unfilmed/Al), samples 13 ($Al_2O_3/Nb$, cathode foil: TiN/Al) and samples 14 ($Al_2O_3/Nb$, cathode foil: unfilmed/Al) manufactured by the aforementioned method and the conventional method.

Consequently, it has been confirmed that a capacitor element is corroded when a negative voltage is applied to a formation vessel to perform end face treatment while no capacitor element is corroded when a negative voltage is applied to a cathode lead wire to perform end face treatment.

Also with the samples 7 to 14, it has been confirmed that a capacitor element employing an anode foil having a matrix made of a prescribed metal and a film made of a metal oxide of the metal and a cathode foil having a matrix of another metal different from the metal is corroded when a negative voltage is applied to a formation vessel to perform end treatment while the capacitor element is not corroded when a negative voltage is applied to a cathode lead wire to perform end face treatment.

Al, Nb, Ta or Ti or an alloy containing any of these elements can be applied to the matrix for the anode oil when an oxide film (dielectric film) is formed by performing formation on the matrix. When a dielectric film is formed by evaporation, on the other hand, the material for the matrix of the anode is not particularly restricted. The dielectric film can be formed by a method of evaporating any of Al, Nb, Ta and Ti and thereafter oxidizing the metal by performing formation. Alternatively, an oxide film of Al, Nb or Ta may be evaporated. The material for the cathode foil is not particularly restricted.

Also with samples 15 (anode foil: $Al_2O_3/Al$, cathode foil: unfilmed/Al) and samples 16 (anode foil: $Al_2O_3/Al$, cathode foil: TiN/Al) in which no capacitor element was corroded when a negative voltage was applied to a formation vessel to perform end face treatment, the inventor has confirmed that no capacitor element is corroded when a negative voltage is applied to a cathode lead wire to perform end face treatment.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of manufacturing an electrolytic capacitor, comprising the steps of:
    forming a capacitor element by winding an anode foil having a matrix made of a prescribed metal and a film made of a metal oxide of a metal different from said metal of said matrix and a cathode foil; and
    forming a metal oxide film of said metal on an end face of said anode foil exposing the surface of said metal by applying a positive voltage to an anode lead wire electrically connected to said anode foil and applying a negative voltage to a cathode lead wire electrically connected to said cathode foil while dipping said capacitor element in a prescribed chemical solution stored in a formation vessel.

2. The method of manufacturing an electrolytic capacitor according to claim 1, wherein
    said metal of said matrix is aluminum or an aluminum alloy, and
    said film is a film of any of titanium oxide, niobium oxide and tantalum oxide.

3. A method of manufacturing an electrolytic capacitor, comprising the steps of:
    forming a capacitor element by winding an anode foil having a matrix made of a first metal and a film made of a metal oxide of said first metal and a cathode foil having a matrix made of a second metal different from said first metal; and
    forming a first metal oxide film of said first metal on an end face of said anode foil exposing the surface of said first metal by applying a positive voltage to an anode lead wire electrically connected to said anode foil and applying a negative voltage to a cathode lead wire electrically connected to said cathode foil while dipping said capacitor element in a prescribed chemical solution stored in a formation vessel.

4. The method of manufacturing an electrolytic capacitor according to claim 3, wherein
    said first metal is any of titanium, niobium and tantalum.

* * * * *